United States Patent
Pal

(10) Patent No.: US 10,198,567 B2
(45) Date of Patent: Feb. 5, 2019

(54) APPARATUS, METHOD AND ARTICLE FOR SECURITY BY PAIRING OF DEVICES

(71) Applicant: DISH Technologies L.L.C., Englewood, CO (US)

(72) Inventor: Rajiv Singh Cullen Pal, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 975 days.

(21) Appl. No.: 14/032,115

(22) Filed: Sep. 19, 2013

(65) Prior Publication Data

US 2015/0077224 A1    Mar. 19, 2015

(51) Int. Cl.
     *G06F 21/35*      (2013.01)

(52) U.S. Cl.
     CPC ...... *G06F 21/35* (2013.01); *G06F 2221/2111* (2013.01)

(58) Field of Classification Search
     CPC ............ G07C 2209/63; G07C 9/00111; G07C 9/00174; G07C 9/00309; G07C 9/00563; G07C 9/00571; G07C 9/00896; G07C 2009/00333; G07C 2009/00357; G08C 17/02; H04L 12/2602; H04L 43/00; H04W 12/06
     USPC ................................ 340/5.61, 5.8, 5.22, 3.1
See application file for complete search history.

(56) References Cited

U.S. PATENT DOCUMENTS

| | | | |
|---|---|---|---|
| 6,374,079 B1* | 4/2002 | Hsu | 455/11.1 |
| 7,363,031 B1* | 4/2008 | Aisa | 455/419 |
| 7,564,369 B1* | 7/2009 | Adams et al. | 340/12.53 |
| 2005/0090267 A1* | 4/2005 | Kotzin | 455/456.4 |
| 2006/0025132 A1* | 2/2006 | Karaoguz et al. | 455/433 |
| 2006/0109966 A1* | 5/2006 | Sasakura et al. | 379/177 |
| 2007/0133843 A1* | 6/2007 | Nakatani | 382/115 |
| 2007/0171091 A1* | 7/2007 | Nisenboim et al. | 340/825.69 |
| 2010/0073127 A1* | 3/2010 | Fukushima | 340/5.6 |

* cited by examiner

*Primary Examiner* — Emily C Terrell
(74) *Attorney, Agent, or Firm* — Seed IP Law Group LLP

(57) ABSTRACT

A functionality of an accessible device such as a set-top box, computer, mobile device, media device, is unlocked or otherwise made available to a user by a security system dependent on an external paired device, such as a mobile device, a key fob or radio frequency identification (RFID) device paired to the accessible device being in a particular wireless communication range of the accessible device. When an authorized user carries the external paired device, this provides the authorized user of the accessible device the ability to conveniently restrict the use of the accessible device and access to various functionalities of the accessible device, such as access to particular television programming or streaming media at times when the authorized user is not in close proximity or in the same general area of the accessible device.

15 Claims, 8 Drawing Sheets

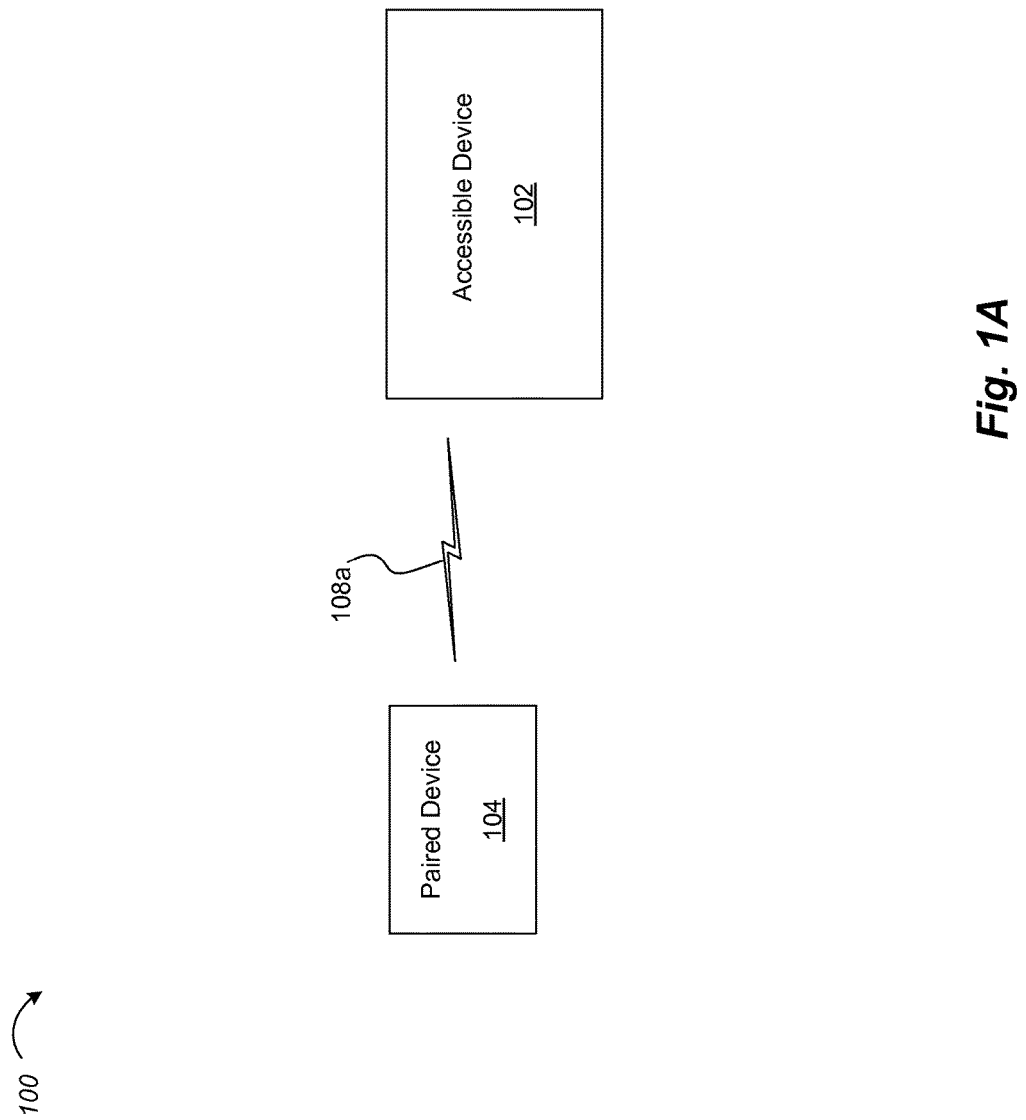

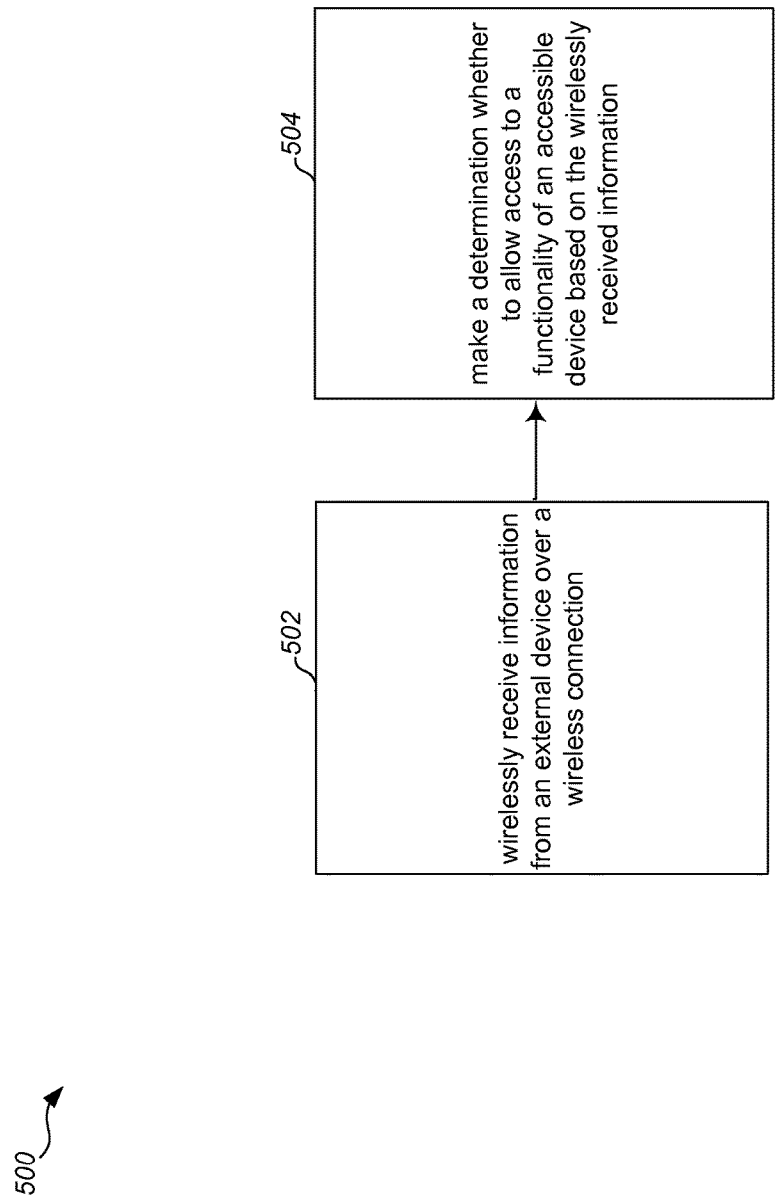

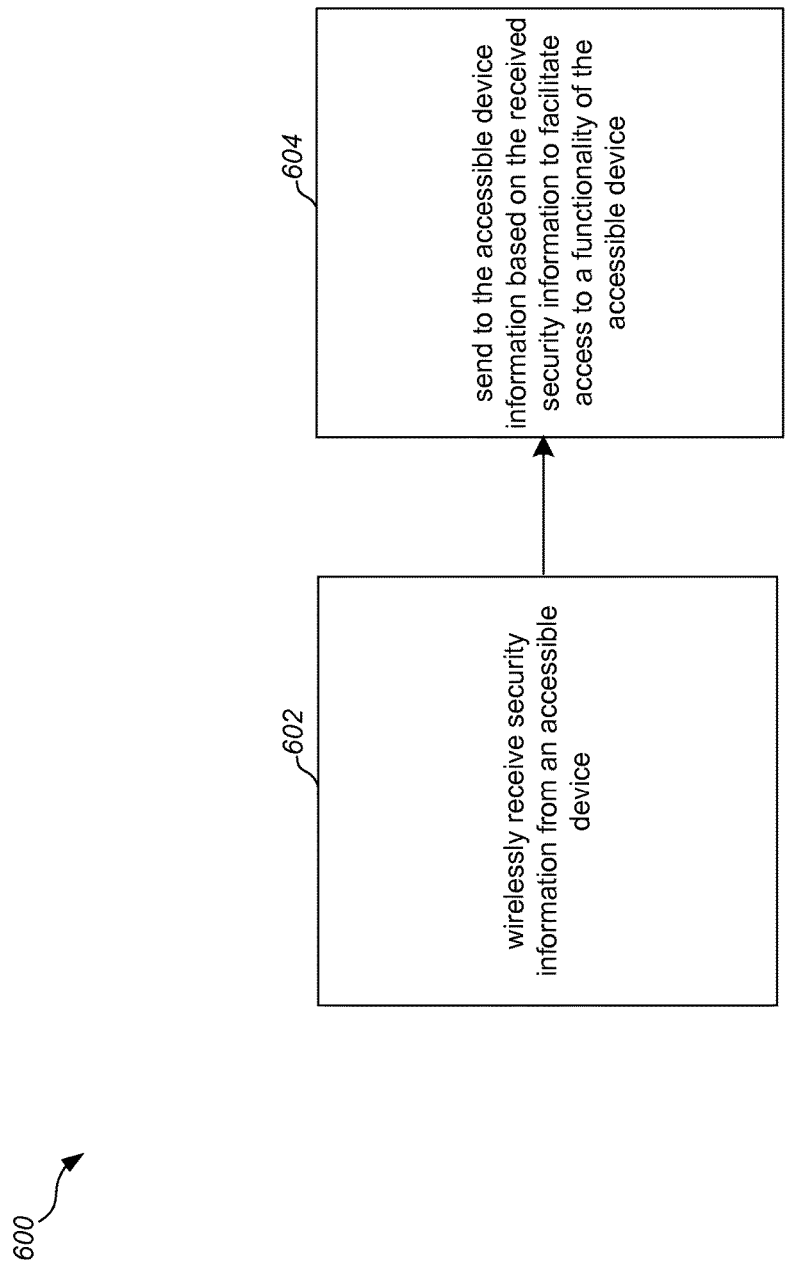

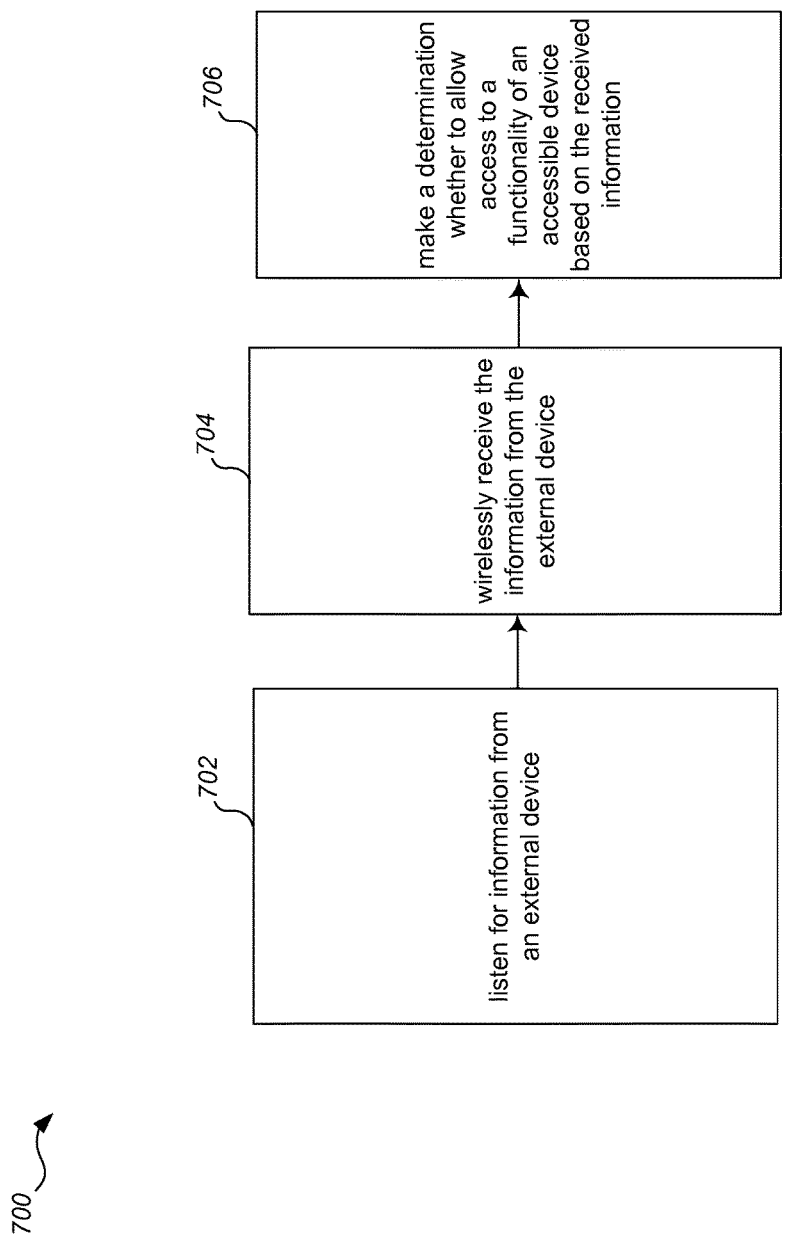

APPARATUS, METHOD AND ARTICLE FOR SECURITY BY PAIRING OF DEVICES

BACKGROUND

Technical Field

The present disclosure generally relates to security, and more particularly to security of electronic devices.

Description of the Related Art

Electronic devices and services are often secured by use of passwords and/or other credential information being manually input. However, more efficient and reliable security systems for such devices and services are needed.

BRIEF SUMMARY

A functionality of an accessible device, such as that of a set-top box, computer, mobile device, media device, etc., and/or a service available via the accessible device is unlocked or otherwise made available to the user by a security system dependent on an external device, such as a mobile device, a key fob or radio frequency identification (RFID) device, etc., paired to the accessible device being in wireless communication range of the accessible device. In some embodiments, the wireless communication connection is one that has a relatively short maximum range such that the paired device must be in close proximity or in the same general area of the accessible device in order for the system to allow the user to access one or more functionalities of the accessible device and/or one or more services available via the accessible device.

Thus, in one embodiment an authorized user may carry the external paired device with them, and when they walk into the room where the accessible device is located (or are otherwise within wireless communication range of the accessible device) the applicable functionality of and/or service of the accessible device will become unlocked or otherwise made available without the authorized user having to manually enter or provide additional user credentials. This may also provide the authorized user the ability to more conveniently restrict the use of the accessible device at times when the authorized user is not in close proximity or in the same general area of the accessible device (e.g., for parents to restrict particular types of usage of the accessible device when they are not present to monitor such use). In some embodiments, such a security system may provide enhanced security by providing another layer of security in addition to the user having to manually provide additional user credentials.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale FIG. 1A is a schematic view of a system for security by pairing of devices according to various embodiments as disclosed herein.

FIG. 5 is a flow diagram showing a method in a security system for an accessible device according to various embodiments as disclosed herein.

FIG. 6 is a flow diagram showing a method in a security system for an accessible device from a perspective of an external device to the accessible device according to various embodiments as disclosed herein.

FIG. 7 is a flow diagram showing a method in a security system for an accessible device including further interaction with the external device paired to the accessible device according to various embodiments as disclosed herein.

DETAILED DESCRIPTION

Figure 1B:
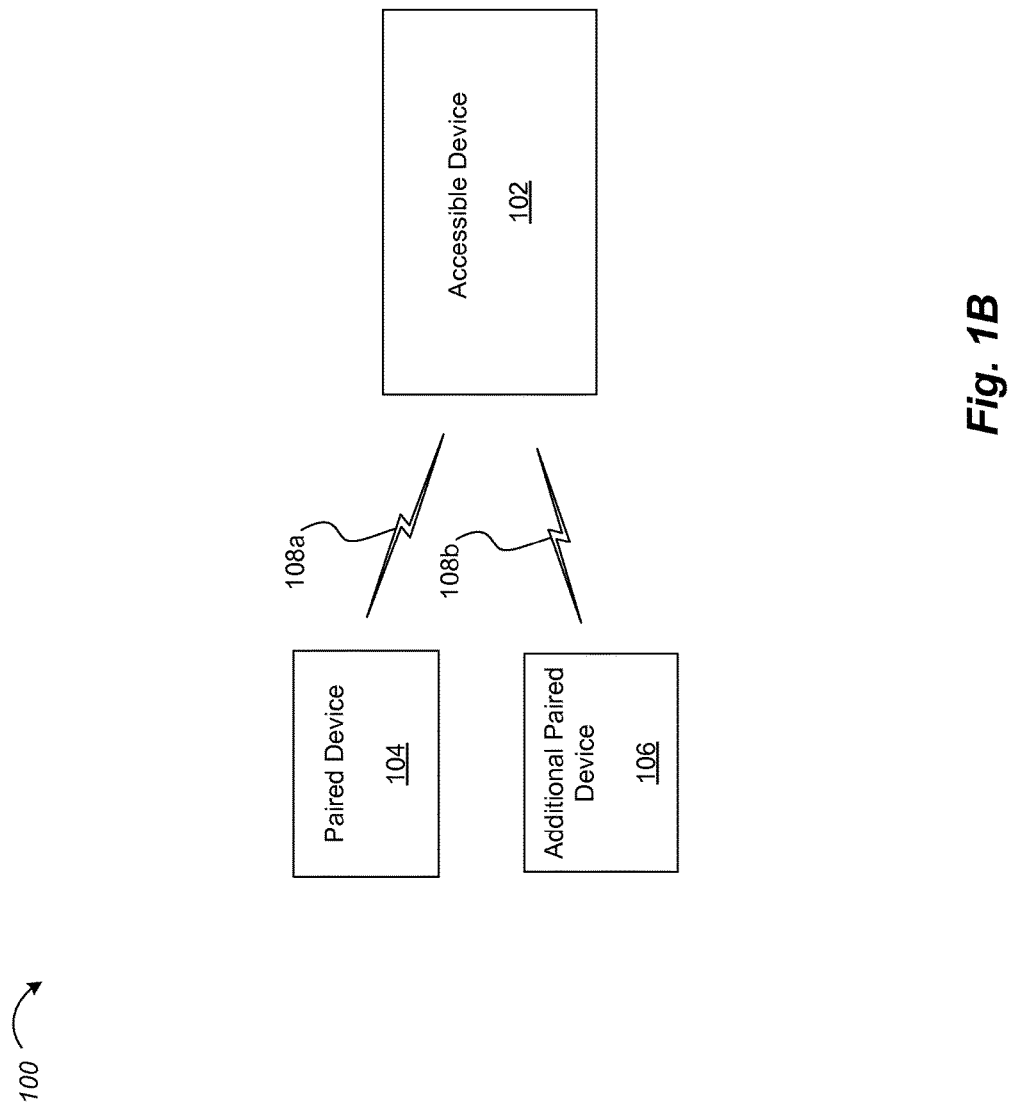
FIG. 1B is a schematic view of a system for security by pairing of multiple devices to an accessible device according to various embodiments as disclosed herein.

In the following description, certain specific details are set forth in order to provide a thorough understanding of various disclosed embodiments. However, one skilled in the relevant art will recognize that embodiments may be practiced without one or more of these specific details, or with other methods, components, materials, etc. Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

FIG. 1A is a schematic view of a system 100 for security that operates by pairing of a device to an accessible device 102. Specifically, paired device 104 is paired to accessible device 102, according to one non-limiting illustrated embodiment.

The accessible device 102 may be any electronic device that has a functionality that may be made available to a user. For example, the accessible device 102 may be one or any combination of: a media device (e.g., any electronic device that receives and/or stores and plays video and/or audio); a receiving device (e.g., cable and/or satellite set-top box or a radio); a television, a digital versatile disk (DVD) player and/or recorder; a digital video recorder (DVR); a music player; a desktop computer; a mainframe computer; a server; a notebook computer; a tablet device; a video game console; an electronic game; a gaming device; an electronic educational device; an electronic children's toy; an electronic book reader; an entertainment system and/or device; an electronic locking device; a remote control device; a network appliance; a home appliance; an office appliance; a home security system device; a watch; a vehicle head unit, deck, stereo, navigation system and/or other electronic media system of a vehicle; a mobile communications and/or processing device having a handheld form factor (e.g., cellular phones, personal digital assistants or (PDAs), Blackberry® devices, iPhone® devices, Android® devices, smartphones, cellular enabled laptop computers, netbook computers and/or tablet devices); or the like.

In various embodiments, the accessible device 102 is able to communicate to paired device 104 directly over wireless connection 108a and paired device 106 directly over corresponding wireless connection 108b. For example, in some embodiments, the type of wireless communication connection 108a may be a short-range wireless connection including, but not limited to, one or more of: a wireless point-to-point connection; a radio frequency identification (RFID) connection; a near field communication (NFC) connection; a Bluetooth® connection, an Infrared Data Association (IrDA) connection according to the applicable IrDA specifications or applicable variations thereof; a wireless universal serial bus (USB) connection, a Z-Wave connection according to the ITU-T G.9959 specification or applicable variations thereof, a ZigBee connection according to the IEEE 802.15 specification or applicable variations thereof, a wireless home area network (HAN) connection (e.g., such as that based on the IEEE 802.11 specification or other applicable wireless standards); a wireless body area network connection (WBAN); a wireless personal area network (WPAN) connection, such as that based on the standard IEEE 802.15 specification or variations thereof; a Wi-Fi connection such as that based on IEEE 802.11 specification or variations thereof; and/or variations of such connections and applicable wireless protocol standards thereof.

In one embodiment, a functionality of the accessible device 102 is made available to the user by the system 100 dependent on the paired device 104 being in wireless communication range of the accessible device 102. In some embodiments, the wireless communication connection 108a is a wireless connection that has a relatively short maximum range such that the paired device 104 must be in close proximity or alternatively in the same general area of the accessible device 102 in order for the system to allow the user to access one or more functionalities of the accessible device 102. For example, it may be that the wireless communication connection 108a is a wireless connection that has a maximum range of communication of any amount less than about ten meters (e.g., 5 meters, 2, meters, 1 meter, half a meter, 3 centimeters, one centimeter, one millimeter, etc.) such that when paired device 104 is not within the particular maximum range, one or more functionalities of the accessible device 102 will be denied. Other wireless connections with different maximum ranges (e.g., those having a maximum range over 10 meters, such as 20 meters or 30 meters, etc.) may be selected. The wireless connection may be selected such that its range corresponds with how close it is desired the paired device 104 be to the accessible device 102 in order to allow access to the applicable functionalities of the accessible device 102.

In one example scenario, an authorized user or system administrator may carry the paired device 104 with them to prevent use of one or more functionalities and/or services available via the accessible device 102 when the authorized user or system administrator is not present at or otherwise in close proximity to the accessible device 102. How close the paired device 104 must be (and thus any person carrying the paired device 104) to the accessible device 102 in order for the applicable functionalities to be allowed by the system 100 may be variable and dependent on the maximum range of the wireless connection 108a. In some embodiments, the maximum range of the wireless connection 108a may be selectable by an administrator or other authorized user of the system 100. In one embodiment, this is done by the administrator selecting the type of wireless connection, while in other embodiments, he may select the power level of the wireless connection 108a used by the system 100. The term administrator as used herein includes any person who has supervisory control of the system, such as a parent, authorized user, system manager or the like.

Enhanced security may be useful in situations where the administrator desires to personally monitor the use of the accessible device 102 by others, or otherwise restrict use of one or more functionalities available via the accessible device 102 to times when the administrator is in close proximity to where the accessible device is located. The range of proximity can be selected based on the type of communication from the wireless paired device 104 carried by the administrator, whether line of sight communication, such as optical or infrared, or a type that does not require line of sight, such as acoustic or radio wave. If radio wave, the transmission band frequency, transmission power or other features can be selected to determine the range of proximity within which the administrator must be for the communication between paired device 104 and accessible device 102 to take place and thus permit selected functionalities of the accessible device 102.

The functionality of the accessible device 102 refers to whether the device is able to perform any one or more of a selected set of functions. These functions may include turning the device on or off; recording programs on the device; viewing certain programs on the device, but not being able to view other programs; providing a service from the device; providing a service via the device; permitting buying a pay-per-view program from the device; using a service available on the device; or any other function which the device may be capable of performing. The failure to pair a paired device 104 to the accessible device 102 may prevent all functions of the accessible device 102, or alternatively, prevent only some of the functions while other functions operate without the paring. This selection can be made under the control of the system administrator by making certain selections in the software set up of the system 100 or by the maker of the system 100.

FIG. 1B is a schematic view of a system 100 for security that operates by pairing of multiple devices to an accessible device 102. Specifically, paired device 104 and additional paired device 106 are paired to accessible device 102, according to one non-limiting illustrated embodiment.

In some embodiments, one or both of the paired device 104 and an additional paired device 106 may be in wireless range of the accessible device over the corresponding wireless connections 108a and 108b in order for the system to allow access to one or more functionalities of the accessible device 102. In some embodiments, a particular combination of paired devices, including paired device 104, additional paired device 106 and one or more other additional paired devices (not shown) may be in wireless range of the accessible device over the corresponding wireless connections 108a and 108b in order for the system to allow access to one or more functionalities of the accessible device 102. For example, either or both parents must be carrying paired devices and be within in wireless range of the accessible device over the corresponding wireless connections 108a and 108b in order for the system to allow access to particular programming or other functionalities of the accessible device 102.

Figure 2:
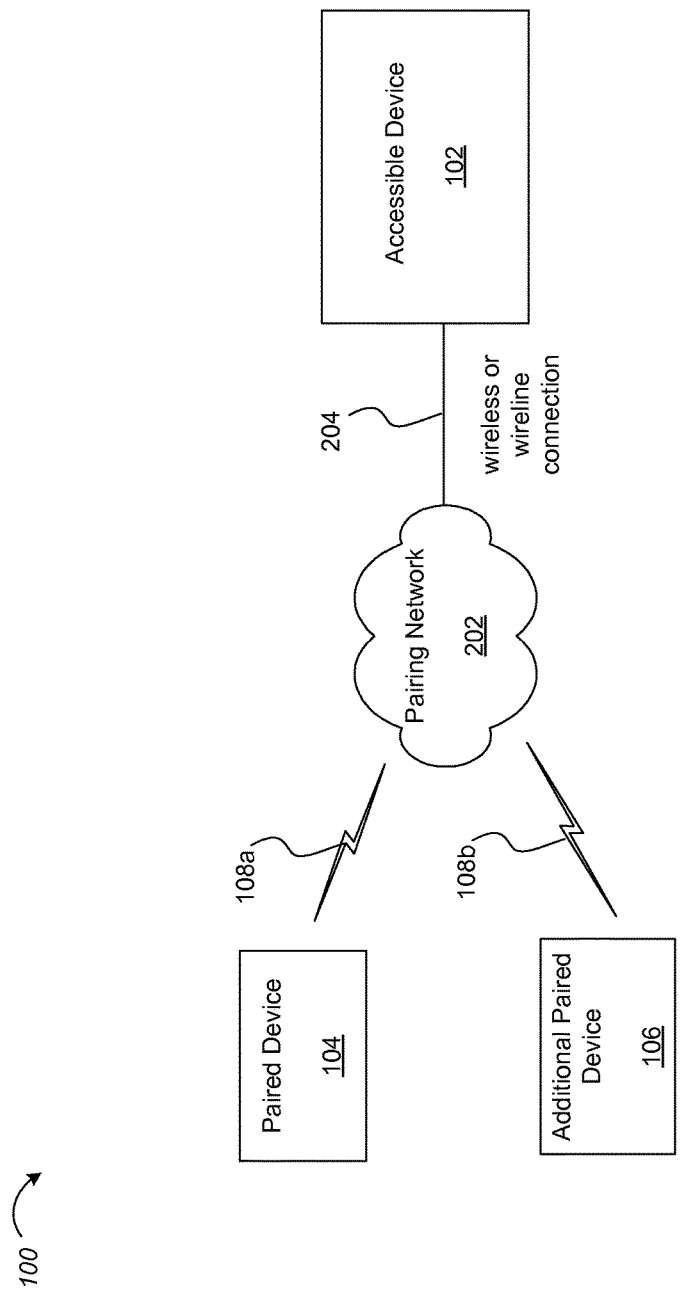
FIG. 2 is a schematic view of a system for security by pairing of devices which shows a pairing network according to various embodiments as disclosed herein.

FIG. 2 is a schematic view of the system 100 for security by pairing of devices which shows a pairing network 202, according to one non-limiting illustrated embodiment.

In some embodiments, any one of the paired device 104 and additional paired device 106 may be in wireless range of the accessible device over the corresponding wireless connections 108a and 108b in order for the system to allow access to one or more functionalities of the accessible device 102. The wireless connections may be point-to-point wireless connections such as those shown in FIG. 1A, or may be connections within or via a more structured network topology represented by pairing network 202 as shown in FIG. 2. In embodiments including pairing network 202, accessible device 102 may be connected to the pairing network via a wireless or wireline connection. In some instances the accessible device 102 communicates over connection 204 to an external transmitter or transceiver device in pairing network 202 connected locally to the accessible device 102. In various embodiments, connection 204 may be a wireless or wireline connection. In other embodiments, all or a particular combination of the paired device 104 and additional paired device 106 must be in wireless range of the accessible device over the corresponding wireless connections 108a and 108b or pairing network 202 in order for the system to allow access to one or more functionalities of the accessible device 102. Which particular combination of the paired device 104 and additional paired device 106 that must be in wireless range of the accessible device over the corresponding wireless connections 108a and 108b or pairing network 202 in order for the system to allow access to one or more functionalities of the accessible device 102 may also be selectable by the administrator of the system 100.

Figure 3:
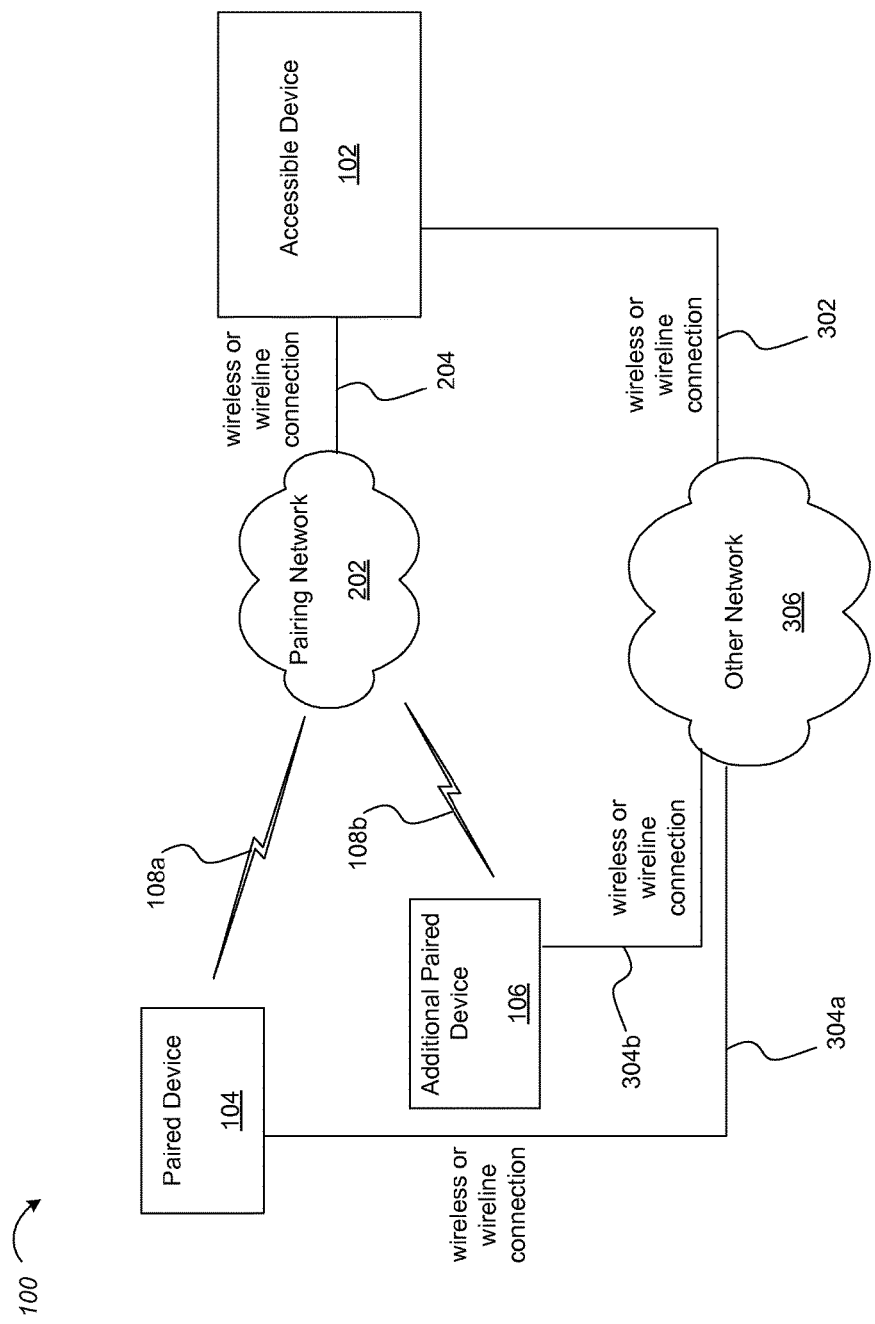
FIG. 3 is a schematic view of a system for security by pairing of devices which shows a pairing network and a separate other network to which the devices are also connected according to various embodiments as disclosed herein.

FIG. 3 is a schematic view of the system 100 for security by pairing of devices which shows the pairing network 202 and a separate other network 306 to which the accessible device 102, paired device 104 and additional paired device 106 are also connected, according to one non-limiting illustrated embodiment.

The accessible device 102, the paired device 104 and the additional paired device 106 may also be connected to a separate other network 306 different than the pairing network 202 via connections 302, 304a and 304b, respectively. Connections 302, 304a and 304b may each be wireless or wireline connections. Also, there may be one or more additional paired devices (not shown) connected to network 306. The network 306 may be any network, combination of networks, and/or layers of networks that enable communication from the various devices connected to the network 306 shown in FIG. 1A to other devices. For example, network 306 may include or provide connections to satellite and/or cable television networks, such as those of a cable service provider, satellite service provider, other data service provider, or of a service provider providing any combination of such services; networks including applicable combinations and layers of telecommunications and networking protocols and standards such as 3G, HTTP and TCP/IP, etc., a local area network (LAN), a wide area network (WAN); the Internet; various analog and/or digital mobile telecommunications networks, for example, including those according to the long-term evolution (LTE), or "4G LTE", standard for wireless communication of high-speed data for mobile phones and data terminals based on the Global System for Mobile Communications (GSM)/Enhanced Data rates for GSM Evolution (EDGE) and Universal Mobile Telecommunications System (UMTS)/High Speed Packet Access (HSPA) network technologies, and/or other network technologies fulfilling specifications by the International Telecommunication Union; a point-to-point network; other communications networks, etc. In some embodiments, the functions available via the accessible device 102 to which the accessible device 102 allows access based on the proximity of the pairing device 104 and/or additional paired device 106 are services available over the other network 306.

The other network 306 may comprise connections to computing systems, such as those in the accessible device 102, the paired device 104 and/or the paired device 106. The network 306 may itself represent multiple interconnected networks. For instance, wired and wireless enterprise-wide computer networks, intranets, extranets, and/or the Internet may be included in or comprise a part of network 306. Embodiments may include various types of communication networks including other telecommunications networks, computer networks, cellular networks, paging networks, and other mobile networks. There may be any variety of computers, switching devices, routers, bridges, firewalls, edge devices, multiplexers, phone lines, cables, telecommunications equipment and other devices within network 306. Some or all of such equipment of network 306 may be owned, leased or controlled by various service providers.

In accordance with an aspect of the accessible device 102, the paired device 104 and/or the paired device 106 may contain discrete functional program modules that might make use of an application programming interface (API), or other object, software, firmware and/or hardware, to request services of one or more of the entities of the security system 100 over pairing network 202 and/or other entities connected to the network 306.

For example, communication can be provided over a communications medium, e.g., client and server systems running on any one of the accessible device 102, the paired device 104 and/or the paired device 106. These client and server systems may be coupled to one another via transmission control protocol/internet protocol (TCP/IP) connections for high-capacity communication. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to know any working details about the other program or the service itself. In client/server architecture, particularly a networked system, a client is usually a computer or device that accesses shared network resources provided by another computer or device.

In the example of FIG. 3, accessible device 102 may be a client requesting security information over pairing network 202, such as authentication information, from paired device 104 and/or additional paired device 106 in order to allow access to a functionality of the accessible device 102 or service available via the accessible device 102. In other embodiments, paired device 104 and/or additional paired device 106 may be passively transmitting such authentication or security information constantly, near constantly, periodically or intermittently in an encrypted or unencrypted format. Once the applicable information is no longer available to the accessible device 102 from paired device 104 and/or additional paired device 106, accessible device 102 will deny access to the applicable functionality. This may be, for example, when paired device 104 and/or additional paired device 106 are no longer in wireless communication range over pairing network 202. In some embodiments, accessible device 102 may also be a client requesting media services such as media on-demand services or television programming from a server over the other network 306 in order to provide such services to an end user. However, any entity or subcomponent or subsystem thereof in FIG. 3, including the accessible device 102, the paired device 104 and/or the paired device 106, can be considered a client, a server, or both, depending on the circumstances.

One or more cellular towers and stations may be part of a cellular network that is part of the network 306 and may be communicatively linked by one or more communications networks or communication mediums within the network 306 (e.g., using a cellular or other wired or wireless signal) in order to facilitate sending and receiving information in the form of synchronous or asynchronous voice communications, video, textual and/or encoded data to and from the objects shown in FIG. 1A, (e.g., accessible device 102). This communication may be over a wireless signal on the cellular network of network 306 using applicable combinations and layers of telecommunications and networking protocols and standards such as 3G, HTTP and TCP/IP, etc. and, among other information, may include services that are received by the accessible device 102 and that are subject to the security system 100 allowing access to such services to an end user via the accessible device 102.

Although the physical environment of the network 306 may have connected devices such as computers and cellular mobile devices, the physical environment may alternatively or additionally have or be described as comprising various digital devices such as personal digital assistants (PDAs), televisions, MP3 players, etc., software objects such as interfaces, Component Object Model (COM) objects and the like. Also, in various embodiments, the software of the security system 100 may be downloaded via the network 306, be pre- installed or reside on one or more of the accessible device 102, the paired device 104 and/or the paired device 106 locally and communicate with various underlying systems, operating systems, and/or APIs and/or software interfaces of other applications residing on the particular device locally. For example, such communication with various underlying systems, operating systems, APIs and/or other software interfaces of other applications residing on the accessible device 102, the paired device 104 and/or the paired device 106 may be configured to be used by the security system 100 to wirelessly receive information directly from the external paired device 104 and/or other paired device 106 directly over the corresponding wireless connections 108*a* and 108*b* and make a determination regarding allowing access to one or more of a functionality of the accessible device 102 and a service available via the accessible device 102 based on the wirelessly received information from the external paired device 104 and/or other paired device 106. Also, such communication with various underlying systems, operating systems, APIs and/or other software interfaces of other applications residing on the accessible device 102, the paired device 104 and/or the paired device 106 may be configured to allow access to the corresponding functionality or service available via the accessible device 102 based on such a determination.

There are a variety of systems, components, and network configurations that may also support distributed computing environments within the security system 100. For example, computing systems may be connected together within the network 306 by wired or wireless systems, by local networks or by widely distributed networks. Currently, many networks are coupled to the Internet, which provides an infrastructure for widely distributed computing and encompasses many different networks. Any such infrastructures, whether coupled to the Internet or not, may, in some embodiments be used in conjunction with, be connected to, or comprise part of the network 306.

Components of the network 306 that support, provide and/or facilitate communications between devices on the network 306 may include those of a service provider. The service provider may be a cellular telephone service provider, receiver EPG display system service provider, Internet service provider, Wi-Fi access service provider, cable service provider, satellite service provider, other data service provider, or a service provider providing any combination of such services, etc. Generally, the service provider charges subscribers for use of the services provided. In the example provided herein, the accessible device 102 may use or include devices belonging to or used by users or entities who subscribe directly or indirectly to services provided by a service provider. Such services provided by a service provider may include those functions available via the accessible device 102.

The embodiments and applicable system components will be described in the general context of computer-executable instructions, such as program application modules, objects, or macros stored on computer- or processor-readable storage media and executed by a computer or processor. In light of the detailed description herein, those skilled in the relevant art will appreciate that the illustrated embodiments as well as various other embodiments can be practiced with other system configurations and/or other computing system configurations, including hand-held devices, multiprocessor systems, microprocessor-based or programmable consumer electronics, personal computers ("PCs"), network PCs, mini computers, mainframe computers, and the like. The embodiments can be practiced in distributed computing environments where tasks or modules are performed by remote processing devices, which are linked through a communications network such as network 306. In a distributed computing environment, program modules may be located in both local and/or remote memory storage devices.

Which functionality of the accessible device 102 to allow or deny access based on the paired device 104 and/or additional paired device 106 being in wireless range of the accessible device 102 may also be a selectable feature provided by the system 100. For example, in embodiments where the accessible device 102 is a television receiver (or cable or satellite set-top box) connected to services such as television programming via the other network 306, a parent administrator may choose the system 100 to have particular television programming (e.g., received over the other network 306) be allowed to be viewed via the accessible device 102 when the paired device 104 carried by the parent is within close proximity of the accessible device 102 (e.g., within the applicable wireless signal range of wireless connection 108*a*), and to allow other programming to be viewed via the accessible device 102 at any time. In this manner, the parent administrator can more easily monitor viewing of particular programming by their children.

As another example, in embodiments where the accessible device 102 is a computing device connected to the Internet (e.g., via other network 306), a parent administrator may choose that particular web sites, streaming media sites and/or chat rooms, etc., be allowed to be visited via use of the accessible device 102 only when the paired device 104 carried by the parent is within the selected proximity range (e.g., within applicable wireless signal range) of the accessible device 102 and allow other web sites to be visited via the accessible device 102 at any time. In this manner, the parent administrator can more easily monitor web sites being visited by their children and increase Internet safety for their family. Overall, the functionality of the accessible device 102 being made available to the user dependent on the paired device 104 being in wireless communication range of the accessible device 102 provides the authorized user the ability to more easily restrict the use of the accessible device 102 and/or various functionalities of the accessible device 102 at times when the authorized user is not in close proximity or in the same general area of the accessible device. For example, this may be applicable for parents to restrict usage of the accessible device 102 when they are not present to monitor such use.

The functionality of the accessible device 102 being made available to the user dependent on the paired device 104 being in wireless communication range of the accessible device 102 may be in addition to other user authentication, security features and/or security layers to further enhance security regarding use of such functionality and/or services via the accessible device 102. For example, use of such functionalities of the accessible device 102 and/or services available via the accessible device 102 may also require additional items including, but not limited to, one or more of: user credentials such as user name and passwords, a code, a security key, an identification number, a time-based code, a combination, biometric data, an encryption key, and an encrypted key, etc. In alternative embodiments, the complete functionality of the accessible device 102 is available to the user conditionally based on the paired device 104 being within wireless communication range of the accessible device 102 instead of one or more of such security features to simplify secure access. For example, this may make it so the user does not have to manually enter their user name and password or provide other credentials to access the applicable functionality of the accessible device 102 available via the accessible device 102.

In various embodiments, the system 100 for security by pairing of devices may include additional or fewer devices and elements than that shown in FIG. 3. For example, in some embodiments, one or more of the separate other network 306, additional paired device 106 and more structured pairing network 202 are not present in the system 100 for security by pairing of devices.

Figure 4:
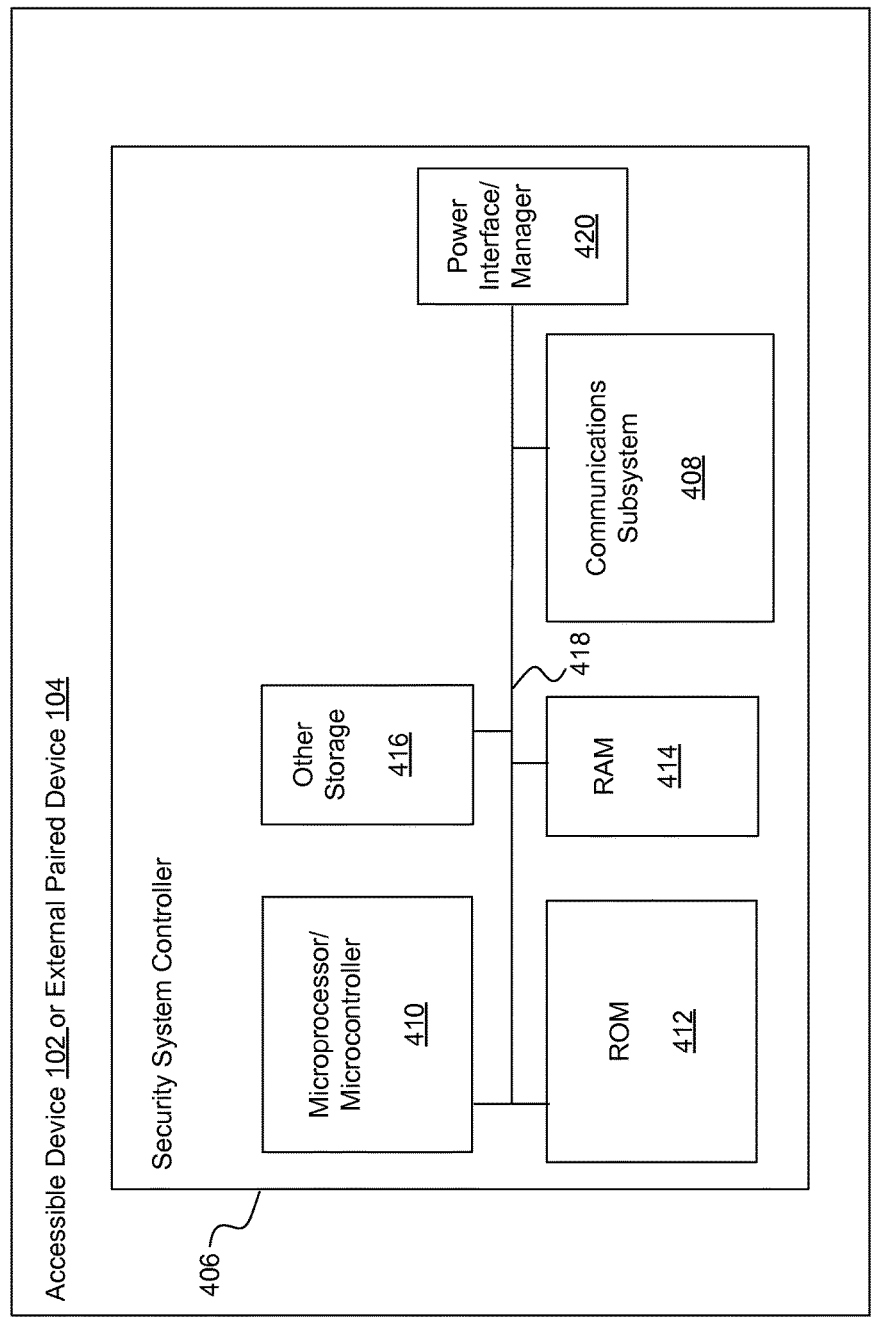
FIG. 4 is a schematic view of a security system controller in a system for security by pairing of devices according to various embodiments as disclosed herein.

FIG. 4 is a schematic view of a security system controller 406 in a system 100 for security by pairing of devices, according to one non-limiting illustrated embodiment.

The security system controller 406 includes a microprocessor 410, a communications subsystem 406, and a power interface manager 420 connected via one or more buses 418 (only one illustrated). The security system controller 406 performs or causes various operations described herein of the system 100 to be performed. For example, the security system controller 406 is configured to use the communications subsystem 406 to wirelessly receive information directly from the external paired device 104 and/or other paired device 106 directly over the corresponding wireless connections 108a and 108b (shown in FIG. 1A), or pairing network 202 (shown in FIG. 2) and make a determination regarding allowing access to one or more of a functionality of the accessible device 102 and a service available via the accessible device 102 based on the wirelessly received information from the external paired device 104 and/or other paired device 106. The security system controller 406 may also be configured to allow access to the corresponding functionality or service available via the accessible device 102 based on such a determination.

In some embodiments, the microprocessor 410 of the security system controller 406 may also be that which controls other functions of the accessible device 102. Additionally, in some embodiments, an equivalent security system controller 406, or applicable modules thereof, may also be present in one or more of the paired device 104 or the additional paired device 106 to cause the functions described herein of those devices to be performed.

The microprocessor 410, for example, is a microprocessor, microcontroller, programmable logic controller (PLC), CPU programmable gate array (PGA), application specific integrated circuit (ASIC) or another controller capable of receiving signals from various sensors, performing logical operations, and sending signals to various components. Typically, the microprocessor 410 may take the form of a CPU microprocessor of the type used in a computer, such as those made by INTEL, AMD, and the like. The security system controller 406 may also include one or more non-transitory processor- or computer-readable storage media, for example, read only memory (ROM) 412, random access memory (RAM) 414, and other storage 416 (e.g., solid-state storage media such as flash memory or EEPROM, spinning storage media such as hard disk). The non-transitory computer-readable storage media 412, 414, 416 may be in addition to any non-transitory storage medium (e.g., registers) which is part of the microprocessor 410. The security system controller 406 may include one or more buses 418 (only one illustrated) coupling various components together, for example, one or more power buses, instruction buses, data buses, etc.

As illustrated, the ROM 412, or some other one of the non-transitory processor- or computer-readable storage media 412, 414, 416, stores instructions and/or data or values for variables or parameters. The sets of data may take a variety of forms, for example, a lookup table, a set of records in a database, etc. The instructions and sets of data or values are executable by the microprocessor 410. Execution of the instructions and sets of data or values causes the microprocessor 410 to perform specific acts to cause the security system controller 406 to generate control signals to, as applicable: communications subsystem 408 communications subsystem 408 use the communications subsystem 406 to wirelessly receive information directly from the external paired device 104 and/or other paired device 106 directly over the corresponding wireless connections 108a and 108b (shown in FIG. 1A), or pairing network 202 (shown in FIG. 2); make a determination regarding allowing access to one or more of a functionality of the accessible device 102 and a service available via the accessible device 102 based on the wirelessly received information from the external paired device 104 and/or other paired device 106; allow access to the corresponding functionality or service available via the accessible device 102 based on such a determination; and other functionalities of the system 100 as described herein. Performance of specific operations caused by the security system controller 406 is described herein and also below with reference to various flow diagrams (shown in FIGS. 5-7).

The microprocessor 410 may use RAM 414 in a conventional fashion, for volatile storage of instructions, data, etc. The microprocessor 410 may use other storage 416 to log or retain information, for example, information including, but not limited to: wirelessly received information from the external paired device 104 and/or other paired device 106 directly over the corresponding wireless connections 108a and 108b or pairing network 202, user credentials such as user name and passwords, a code, a security key, an identification number, a time-based code, a combination, biometric data, an encryption key, and an encrypted key, computer executable instructions, etc. The instructions are executable by the microprocessor 410 to control operation of the security system controller 406 in response to input from remote systems such as those of the paired device 104 and/or other paired device 106. The control subsystem 402 may also receive signals from various sensors, transmitters, transceivers, and/or components of the paired device 104 and/or other paired device 106 via the communications subsystem 408. This information may include information that characterizes or is indicative of the authenticity, authorization level, operation, status, and/or condition of such components, the paired device 104 and/or other paired device 106.

The communications subsystem 408 may include one or more communications modules or components which facilitates communications with the various components of the paired device 104 and other paired device 106, such that data may be exchanged between the paired device 104 and other paired device 106, as well as with the accessible device 102 for authentication purposes. The communications subsystem 408 may additionally provide wired communications, such as to communicate over those which may occur over connection 302 shown in FIG. 3. The communications subsystem 408 may include one or more ports, wireless receivers, wireless transmitters or wireless transceivers to provide wireless signal paths to the various remote components or systems.

The communications subsystem 408 may, for example, include components enabling communication over a short-range wireless connection including, but not limited to, one or more of: a wireless point-to-point connection; a radio frequency identification (RFID) connection; a near field communication (NFC) connection; a Bluetooth® connection; an Infrared Data Association (IrDA) connection according to the applicable IrDA specifications or applicable variations thereof; a wireless universal serial bus (USB) connection; a Z-Wave connection according to the ITU-T G.9959 specification or applicable variations thereof; a ZigBee connection according to the IEEE 802.15 specification or applicable variations thereof; a wireless home area network (HAN) connection (e.g., such as that based on the IEEE 802.11 specification or other applicable wireless standards); a wireless body area network connection (WBAN); a wireless personal area network (WPAN) connection, such as that based on the standard IEEE 802.15 specification or variations thereof; a Wi-Fi connection such as that based on IEEE 802.11 specification or variations thereof; and/or variations of such connections and applicable wireless protocol standards thereof. The communications subsystem 408 may include one or more modems 452 or one or more Ethernet or other types of communications cards or components for enabling network communications as applicable. The communications subsystem 408 may include one or more modules suitable to handle network traffic including switched packet type communications protocols (TCP/IP), Ethernet or other networking protocols. In some embodiments, some or all of the components of the security system controller 406 may be located outside of the accessible device 102 as a separate device that authenticates, verifies or otherwise controls other security functions of the accessible device 102. Also, the communications subsystem 408 may be configured to provide encrypted communications over the connections 108a, 108b, the pairing network 202 and/or the other network 306. In some embodiments, a separate communications subsystem (not shown) of the accessible device 102 is configured for and responsible for communications over the other network 306.

The Power Interface Manager 420 is controllable by the microprocessor 410 and is configured to provide power to the security system controller 406 from either a built-in battery (not shown) or an external power source.

In operation, the communications subsystem 408 of the security system controller 406 of the accessible device 102 may be listening for information from the paired device 104 (e.g., over wireless connection 108a) that includes information to enable the availability of the applicable functionality of the accessible device 102. For example, this information may include one or more of: a password, a code, a user name, a security key, an identification number, a time-based code, a combination, an encryption key, and an encrypted key or other authentication or security information that the accessible device 102 will use to authenticate or otherwise verify the paired device as being authorized to enable the availability of the applicable functionality and/or service via the accessible device 102. In some embodiments, the accessible device 102 may send out a request or other signal (e.g., using the communications subsystem 408) to the external paired device 104 to which the paired device 104 may respond that includes the information to enable the availability of the applicable functionality via the accessible device 102. In such instances, the paired device 104 may also authenticate the signal from the accessible device 102 in a similar manner as that described above. Such communication protocol may also be in accordance with, or at least partially depend on or otherwise be in accordance with, the applicable type of wireless connection 108a being used.

When the accessible device 102 receives such information from the paired device 104 that includes information to enable the availability of the applicable functionality via the accessible device 102, the accessible device 102 will then allow access to the applicable functionality of the accessible device 102. For example, this may be performed by the security system controller 406 of the accessible device 102 sending an appropriate authorization signal to the corresponding hardware or software components of the accessible device 102 that control access to such functionalities on or via the accessible device 102.

FIG. 5 is a flow diagram showing a method 500 in security system 100 for an accessible device 102, according to one non-limiting illustrated embodiment.

At 502, the security system 100 wirelessly receives information from an external device over a wireless connection.

At 504, the security system 100 makes a determination whether to allow access to a functionality of an accessible device 102 based on the wirelessly received information.

FIG. 6 is a flow diagram showing a method 600 in security system 100 for an accessible device 102 from a perspective of a device 104 external to the accessible device 102, according to one non-limiting illustrated embodiment.

At 602, the security system 100 wirelessly receives security information from an accessible device 102.

At 604, the security system 100 sends to the accessible device 102 information based on the received security information to facilitate access to a functionality of the accessible device 102.

FIG. 7 is a flow diagram showing a method 700 in security system 100 for an accessible device 102, including further security interaction with an external device paired to the accessible device 102, according to one non-limiting illustrated embodiment.

At 702, the security system 100 listens for information from an external device.

At 704, the security system 100 wirelessly receives the information from the external device.

At 706, the security system 100 makes a determination whether to allow access to a functionality of an accessible device 102 based on the received information.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape. The various embodiments described above can be combined to provide further embodiments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art in light of the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

I claim:

1. A security system for an accessible device comprising:
    a controller; and
    a communications module coupled to the controller, wherein the controller is configured to:
        use the communications module to wirelessly receive information from an external device over a wireless connection that has a maximum range of communication of any amount less than about ten meters;
        make a determination whether to allow access to a functionality of the accessible device based on the wirelessly received information from the external device; and
        allow access to the functionality of the accessible device if a result of the determination is to allow the access.

2. The security system of claim 1 wherein the controller is further configured to:
    use the communications module to wirelessly send information from the accessible device over the wireless connection to the external device, wherein the information received from the external device is received in response to the wirelessly sent information sent to the external device from the accessible device.

3. The security system of claim 1 wherein the accessible device is a media device.

4. The security system of claim 3 wherein the functionality is enabling viewing of one or more of: television programming, a streaming media service, and a media on-demand service.

5. The security system of claim 4 wherein the controller is further configured to:
    receive authentication information input from a user in addition to the wirelessly received information from the external device, and wherein the controller is further configured to make the determination whether to allow the access to the functionality of the accessible device based on the wirelessly received information from the external device and on the additionally received authentication information input from the user.

6. The security system of claim 5 wherein the authentication information input from the user includes one or more of: a password, a code, a user name, a security key, an identification number, a time-based code and a combination.

7. The security system of claim 4 wherein the controller is configured to make a determination regarding allowing access to the service available via the media device based on the wirelessly received information from the external device without additional authentication information.

8. The security system of claim 4 wherein the external device is a device selected from the group consisting of: a radio frequency identification (RFID) device, a mobile device, a wristwatch, a key fob, a smartcard, a control access card (CAC), a near filed communication (NFC) device, a computer, a tablet device, a personal digital assistant, a remote control device, a mobile telephone, an infrared wireless device, a media player device, an electronic door opener, a device to be plugged in a power outlet, a passive RFID device, a security token, and a short-range wireless device.

9. The security system of claim 1 wherein the controller is further configured to:
  use the communications module to wirelessly receive information from one or more additional external devices over one or more corresponding additional wireless connections that each have a maximum range of communication of any amount less than about ten meters; and
  make the determination whether to allow access to the functionality of the accessible device based additionally on the wirelessly received information from the one or more additional external devices.

10. The security system of claim 1 wherein the wirelessly received information on which the determination whether to allow access to the functionality of the accessible device is based includes parental control information regarding restrictions on viewing particular programming via the accessible device.

11. The security system of claim 1 wherein the wirelessly received information on which the determination whether to allow access to the functionality of the accessible device includes parental control information regarding restrictions on viewing particular programming via the accessible device.

12. The security system of claim 1 wherein the controller is further configured to:
  deny access to one or more functionalities of the device based on the determination regarding allowing access.

13. The security system of claim 1 wherein the controller is further configured to:
  deny access to the one or more services available via the device based on the determination regarding allowing access.

14. The security system of claim 1 wherein the wirelessly received information on which the determination whether to allow access to the functionality of the accessible device includes: a password, a code, a user name, a security key, an identification number, a time-based code, a combination, an encryption key, and an encrypted key.

15. The security system of claim 1 wherein the controller is configured to make the determination regarding allowing access by:
  comparison of the wirelessly received information from the external device to previously stored security information associated with the one or more of a functionality of the accessible device and a service available via the accessible device, wherein the determination whether to allow access to the functionality of the accessible device is based on the comparison.

* * * * *